United States Patent [19]
Hayakawa

[11] Patent Number: 5,478,449
[45] Date of Patent: Dec. 26, 1995

[54] METHOD AND APPARATUS FOR PROCESSING WASTE GAS

[76] Inventor: Hideo Hayakawa, 2656-12, Moriya-ko, Moriya-machi, Kita-soma-gun, Ibaraki-ken, Japan

[21] Appl. No.: 274,707

[22] Filed: Jul. 14, 1994

[30]     Foreign Application Priority Data

Mar. 4, 1994  [JP]  Japan .................... 6-034563

[51] Int. Cl.⁶ .................................................. C02F 1/461
[52] U.S. Cl. .................... 204/130; 204/149; 95/149; 423/212; 423/235; 423/240 R; 423/243.01
[58] Field of Search ...................... 204/149, 130; 95/149; 423/212, 235, 240 R, 243.01

[56]         References Cited
         U.S. PATENT DOCUMENTS 4,670,234  6/1987  Hölter et al. ..................... 423/235

Primary Examiner—John Niebling
Assistant Examiner—Arun S. Phasge
Attorney, Agent, or Firm—Nikaido, Marmelstein, Murray & Oram

[57]         ABSTRACT

Disclosed is an improved waste gas processing method and apparatus using reduced water to contact waste gas, thereby removing noxious substances therefrom or turning it into nontoxic gas. Also, inactivation of acid effect is advantageously caused, and hence, acid erosion which otherwise, would be caused by acid solution originating from the noxious substances can be prevented, and accordingly the life of installations is extended. Such inactivation of acid effect facilitates collection of acid solutions.

3 Claims, 3 Drawing Sheets

METHOD AND APPARATUS FOR PROCESSING WASTE GAS

BACKGROUND OF THE INVENTION

1. Field of the Invention

The present invention relates to method and apparatus for processing nitrogen oxide, hydrogen chloride, sulcurous acid and other noxious substances of waste gases from incinerators or vehicles to remove noxious substances from such waste gas or turning it into non-toxic gas.

2. Description of Related Art

In conventional waste gas processing methods waste gases are processed by using catalysts or by passing through water or alkaline solution.

These conventional waste gas processing methods, however, require expensive installation, still yielding unsatisfactory results. Catalysts are expensive. Hydrochloric acid or sulfuric e acid are yielded in the tank while waste gas passes through the water bath, and the acid content of the water bath increases with time until the concrete or steel tank is eroded to be useless. As a matter of fact, such concrete or steel tanks cannot be used in two or three months, In case of alkaline solution the processing costs much, and tanks cannot be used a longer period, either.

SUMMARY OF THE INVENTION

The inventor has found that water whose oxidation-reduction potential (abbreviated as "ORP") is reduced is capable of removing noxious substances from waste gas or turning it into nontoxic gas.

One object of th present invention is to provide a method of effectivel removing noxious substances from waste gas or turning it into non-toxic gas at a reduced cost.

Another object of the present invention is to provide an apparatus of effectively removing noxious substances from waste gas or turning it into non-toxic gas at a reduced cost, assuring a long term of use.

To attain these objects a waste gas processing method according to the present invention comprises the steps of applying voltage to water to prepare water whose oxidation-reduction potential is reduced (referred hereinafter as "reduced water"); and spraying such water in waste gas thereby removing noxious substances therefrom or turning it into non-toxic gas.

Also, a waste gas processing method according to the present invention comprises the steps of: applying voltage to water to prepare reduced water; filling a screen tank with the so prepared water, said screen tank being provided by delimiting a given space in a waste gas duct; and supplying the flow of waste gas to the screen tank to pass therethrough, thereby removing noxious substances from the waste gas or turning it into non-toxic gas.

A waste gas processing apparatus according to the present invention comprises: at least one spraying nozzle positioned in the flow of waste gas; a water processing apparatus including a reservoir having a ground electrode and a pair of voltage-applying electrodes (referred hereinafter as "water-reduction apparatus"), a dc power supply, first and second high-frequency switching devices connected to the de power supply via a variable resistor to convert the dc voltage from the dc power supply to a high-frequency ac voltage for applying to the voltage-applying electrodes, a high-frequency switching command circuit comprising a flip-flop circuit, and a high-frequency oscillator to direct a high-frequency signal to the high-frequency switching command circuit; and a water supplying system to supply water from the reservoir to the spraying nozzle.

Also, a waste gas processing apparatus according to the present invention comprises: a waste duct having a screen tank delimited therein, permitting the flowing of waste gas through the screen tank; a water-reduction apparatus a dc power supply, first and second high-frequency switching devices connected to the dc power supply via a variable resistor to convert the dc voltage from the dc power supply to a high-frequency ac voltage for applying to the voltage-applying electrodes, a high-frequency switching command circuit comprising a flip-flop circuit, and a high-frequency oscillator to direct a high-frequency signal to the high-frequency switching command circuit; and a water supplying system to supply water from the reservoir to the screen tank.

The reservoir may have two ground electrodes positioned Facing each other, and first and second low-frequency switching devices may be connected to the opposing ground electrodes and to a low-frequency switching command circuit, which is connected to the high-frequency oscillator.

When waste gas is processed by spraying reduced water in the flow of waste gas, pulverized substance in the waste gas agglomerates, and such agglomeration is precipitated whereas nitrogen oxide, hydrogen chloride, sulfurous acid and other noxious substances turn to stable liquid phase. The resulting strong acids such as hydrochloric acid or sulfuric acid are found to have inactive acid effect. As a result no substantial acid erosion is caused in portions of waste gas ducts and other installations which are exposed to such strong acid. Also, collection of such strong acids is facilitated.

When waste gas is processed by passing through a reduced water bath, similar effects are caused. Inactivation of such acid solutions is noticeable increasingly with tile increase of potential difference between the strong acid solution and the reduced water.

Reduced water is prepared in the reserve it of the water-reduction apparatus, and the so prepared reduced water is supplied to spraying nozzles via associated pump and conduits. In the water-reduction apparatus the high-frequency oscillator directs a high-frequency signal to tile high-frequency switching command circuit, which in turn, directs a high-frequency switching command signal to the first and second high-frequency switching devices alternately, thereby causing these switching devices to turn "on" or "off" alternately to provide a high-frequency alternating current. The high-frequency ac voltage is applied to a pair of electrodes in the water bath to: reduce the oxidation-reduction potential of the water in a relatively short time, and at tile same time; decompose organic substances of the water into gases; and agglomerate such organic substances for precipitation.

In a waste gas processing apparatus using a screen tank, the waste gas passes through the reduced water bath in the screen tank while passing through the waste gas duct. Reduced water is supplied from a water-reduction apparatus to be circulated through the screen tank, thereby renewing tile reduced water in the screen tank all tile time. The associated water-reduction apparatus is of tile same structure as described above, and therefore, description of the water-reduction apparatus is omitted.

The waste gas processing method and apparatus can be applied to the processing of waste gas from incinerators, vehicles or at crossings and other places whose atmosphere is contaminated with waste gas.

Other objects and advantages of the present invention will be understood for the following description of preferred embodiments of the present invention, which preferred embodiments are shown in accompanying drawings:

DESCRIPTION OF THE PREFERRED EMBODIMENTS

Figure 1:
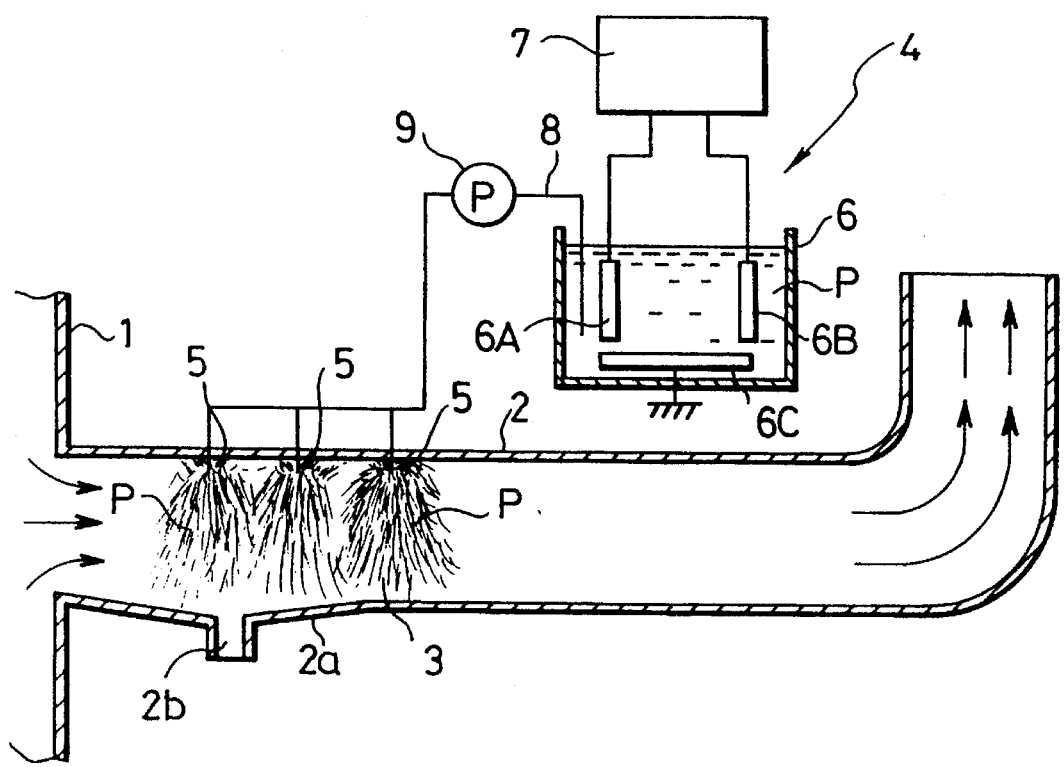
FIG. 1 shows diagrammatically a waste gas processing system in which waste gas is washed by spraying reduced water.

Referring to FIG. 1, a waste gas processing apparatus is shown as being applied to a waste gas duct 2 extending from an incinerator 1. A water-reduction apparatus 4 yields reduced water P.

A plurality of spraying nozzles 5 are fixed to the waste gas duct 2 so as to permit the spraying of reduced water over tile crossing or transverse area of the duct passage 3, in which crossing or transverse area each of the spraying nozzles 5 is contained. Reduced water is supplied from the water-reduction apparatus 4 to each spraying nozzle 5 via a pump 9 and associated conduit 8. A drain 2b and surrounding inclination 2a are formed on tile bottom of tile waste gas duct under the spraying nozzles 5 to collect sprayed water.

The water-reduction apparatus 4 comprises a reservoir 6 and a control box 7. The reservoir 6 has a pair of voltage applying electrodes 6A and 6B and a ground electrode 6C. Such electrodes may be made of materials appropriate for reducing oxidation-reduction potential of water, such as lithium oxide, zinc, magnesium alloy, iron, stainless steel, copper or titanium.

These electrodes 6A and 6B are connected to the control box 7 outside of the reservoir 6 as seen. Specifically a dc power supply 10 of 10 to 100 volts is connected to first and second high-frequency switching devices 12A and 2B, which are made up by transistors 13A, 14A and 13B, 14B respectively. These transistor switching degrees function to convert the dc voltage from the dc power supply to a high-frequency ac voltage, which is applied to tile voltage-applying electrodes 6A and 6B. These electrodes 6A and 6B are connected to each other by a capacitor 15.

A high-frequency switching command circuit 17 which is composed of a flip-flop circuit is connected to tile-first and second high-frequency switching degrees 12A and via resistors 16A and 16B. The high-frequency switching command circuit 17 is, in turn, connected to a high-frequency oscillator 18, which provides high-frequency signals ranging from 30 to 50 KHz.

The reservoir 6 is connected to a city water supply (not shown), and can be supplied with water when demanded.

Figure 3:
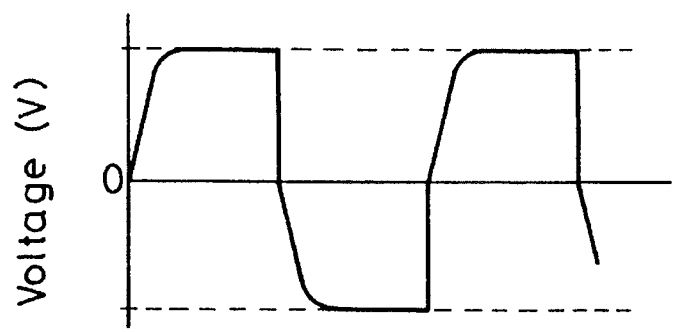
FIG. 3 shows a waveform of high-frequency ac voltage to be applied to tile voltage applying electrodes in the water-reduction apparatus.
Figure 4:
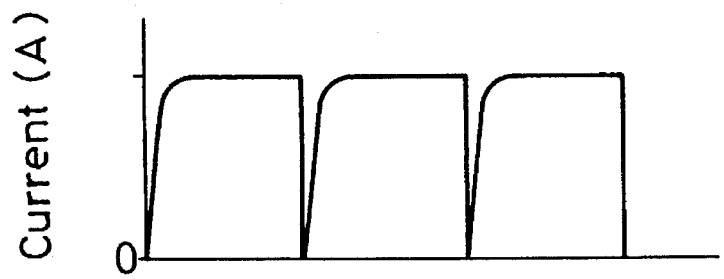
FIG. 4 shows a waveform of dc current flowing through the ground electrode in the water-reduction apparatus.

In preparing reduced water by using such water-reduction apparatus 4, the reservoir 6 is filled with water, and an associated switch turns "on" for a predetermined period or intermittently for a predetermined period with the aid of timer (not shown). When the switch turns "on", the high-frequency oscillator 18 is energized by the dc power supply 10 to supply the high-frequency switching command circuit 17 with a high-frequency signal, thereby causing the high-frequency switching command circuit 17 to direct a high-frequency switching command signal to the first and second high-frequency switching devices 12A and 12B alternately. As a result these switching devices 12A and 12B turn "on" or "off" alternately at the high-frequency to provide a high-frequency ae voltage, which is applied to the voltage-applying electrodes 6A and 6B alternately. FIG. 3 shows a waveform of ae voltage appearing across the voltage-applying electrodes 6A and 6B. The amplitude off the ac voltage can be controlled by adjusting the variable resistor 11. FIG. 4 shows a waveform of de current appearing between the voltage-applying electrodes 6A and 6B and the ground electrode 6C. The dc current wave form can be shaped appropriately by adjusting the capacitance of the condenser 15, but the rectangular waveform as shown is most appropriate for reducing the oxidation-reduction potential of water.

The reduced water of reduced oxidation-reduction potential is supplied from the reservoir 6 to the spraying nozzles 5 via the pump 9 and associated conduit 8. Thus, the reduced water is sprayed in the waste gas flow in the duct. Pulverized carbon and carbon compound contained in the waste gas agglomerate to be precipitated and eared by the reduced water converging toward the drain 2b, and hydrogen chloride, sulfur oxide, nitrogen oxide and other noxious substances turn to stable liquid phase. These liquefied noxious substances and pulverized substances are collected from the drain 2b.

These collected solution containing liquefied noxious substances and acids were found to have a least acid effect inspire of relatively high acid concentration ranging from 20 to 30 percent, compared with ordinary hydrochloric acid or sulfuric acid solution of same concentration. This inactivation appears to be caused by reduced water. It was realized that addition of reduced water to commercially available hydrochloric acid or sulfuric acid causes reduction of acid effect and that the lowering of acid effect is noticeable increasingly with the increase of the potential difference between the reduced water and the matter to be treated.

Thanks to the least acid effect of collected solution the collected solution can be disposed with safety and ease, and the life of pipe, tank and other facilities which are exposed to such solution is substantially elongated. If concrete or stainless steel tanks are filled with water washing noxious waste gases, they will be eroded where exposed to such solution, and will be damaged after two or three months. In contrast such concrete or stainless steel tanks which are used in processing waste gases according to the present invention, are found to be free of erosion even after six months.

In this particular embodiment the duct is laid, and a plurality of spraying nozzles are fixed to the horizontal duct. As a matter of course, the present invention can be equally applied to an upright duct by providing a plurality of spraying nozzles thereto and by supplying reduced water to the spraying nozzles.

Table 1 shows the measurements of noxious substances in waste gasses after being processed according to conventional method using city water and the present invention using reduced water.

TABLE 1

| items | unit | results invention | prior art | measuring methods |
|---|---|---|---|---|
| waste gas quantity (wet) | Nm$^3$/h | 2.699 | 4.210 | JIS Z 8808 |
| waste gas quantity (dry) | | 2.053 | 3.250 | |
| waste gas temp. | °C. | 79.0 | 55 | |
| water content of waste gas | % | 23.92 | 22.8 | JIS Z 8808 moisture tube method |
| composition of waste gas | | | | |
| CO$_2$ | % | 7.20 | 8.3 | JIS B 7983 |
| CO | | 0.00 | 0.0 | Olzatt |
| O$_2$ | | 8.20 | 9.7 | Method |
| N$_2$ | | 84.60 | 82.0 | |
| soot concentration | | | | |
| measured value | g/Nm$^3$ | 0.1267 | | JIS Z 8808 cylindrical filter paper |
| O$_2$ conversion value | | 8.20 0.0891 | 0.009 | rules of the air-pollution preventing law |
| sulfur oxide concentration | ppm | <19 | <10 | JIS K0103 turbidity comp. |
| nitrogen oxide concentration | | | | |
| measured value | ppm | <9 | | JIS K0104 PDS method |
| O$_2$ conversion value | | 8.20 <6 | | rules of the air-pollution preventing law |
| hydrogen chloride | mg/Nm$^3$ | <20 | <38 | JIS K0107 Ion electrode method |

As is apparent from Table 1, the present invention attains a better result than the conventional processing method. The most noticeable result attained by the present invention, however, could not be given in this table. Specifically, the most noticeable result attained by the present invention is reduction of the acid effect of hydrochloric acid, sulfuric acid and other strong acids, that is, reduction or inactivation of noxiousness of such noxious substances contained in waste gasses.

Figure 2:
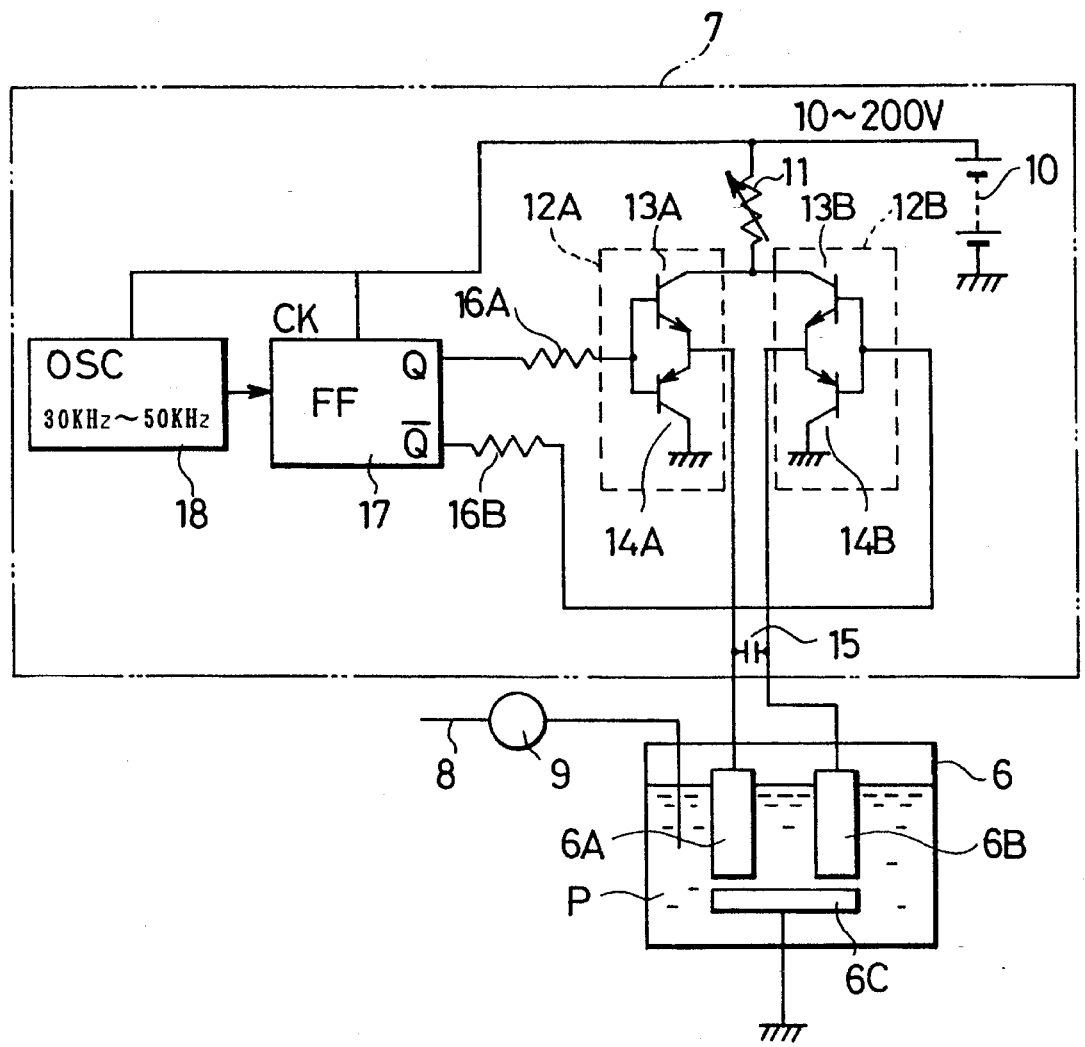
FIG. 2 shows a water-reduction apparatus.
Figure 5:
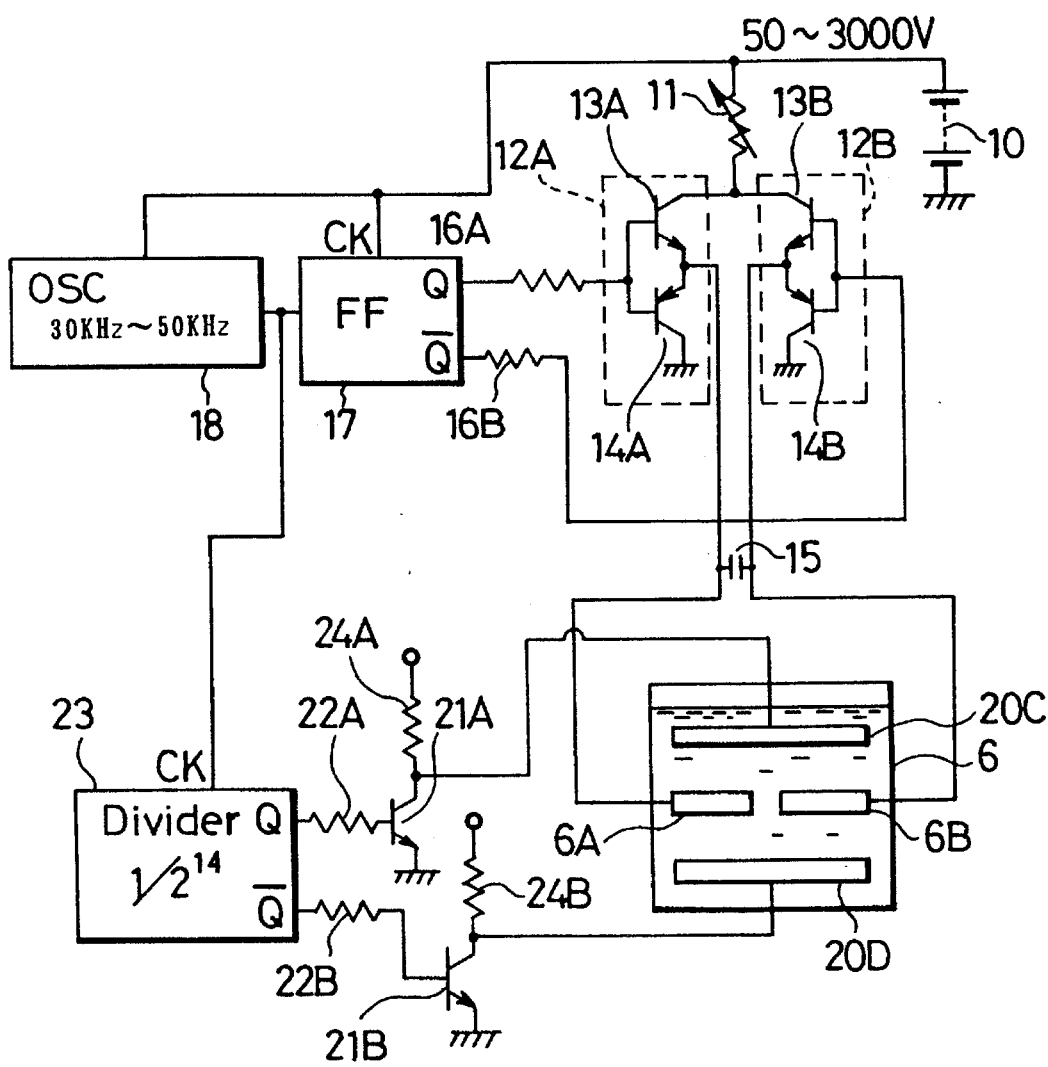
FIG. 5 shows another water-reduction apparatus.

FIG. 5 shows a water-reduction apparatus according to another embodiment of the present invention. It is similar to the first embodiment except for two ground electrodes and an associated low-frequency switching device to permit these ground electrodes to be grounded alternately at a low frequency. Same reference numerals as used in FIG. 2 are used to indicate same parts in FIG. 5, and description of these same parts is omitted.

A pair of opposing ground electrodes 20C and 20D are connected to associated low-frequency switching devices 21A and 21b to permit these ground electrodes to be grounded alternately at a low frequency. These low-frequency switching devices 21A and 21B are connected to a low-frequency switching command circuit 23 via associated resisters 22A and 22B. The low-frequency switching command circuit 23 is connected to the high-frequency oscillator 18 to divide the high-frequency ranging from 30 to 50KHz, for instance by 214, thereby directing a low-frequency switching command to the low-frequency switching devices 21A and 21B.

The collector electrodes of the transistor switching devices 21A and 21B are connected to the positive terminal of an associated de power supply to Keep tile ground electrodes 20C and 20D at positive potential when these switching devices 21A and 21B turning "off". With this arrangement adhesion of dirt is prevented on the ground electrodes 20C and 20D.

In place of the spraying nozzles 5 a concrete or steel tank may be provided by delimiting a predetermined space in the waste gas duct, and the so formed screen tank is filled with reduced water while renewed by circulating reduced water through the screen tank all the time. Waste gas is forced to pass through the reduced bath simply by putting the waste gas conduit open to the inlet of the duct because tile waste gas flows in the waste gas conduit at an increased temperature and pressure.

While passing through the reduced water bath, pulverized carboil and carbon compound contained in the waste gas agglomerate, and such agglomeration is precipitated and carried by the reduced water converging toward the drain whereas hydrogen chloride, sulfur oxide, nitrogen oxide and other noxious substances turn to stable liquid phase. These liquefied noxious substances and pulverized substances are collected from the drain 2b. Also, the waste gas is cooled.

In the second embodiment the waste gas is made to contact the reduced water still more effectively than the first embodiment. The Increasing of acid concentration with time, however, necessitates circulation of reduced water through the tank, and hence expensive water-circulation equipment is required.

Also, electrodes for preparing reduced water may be provided in the screen tank to apply are voltage across the water bath.

The present invention is described above as being applied to incinerators, but it can be equally applied to vehicles or places where noxious waste gas prevails for instance crossings or other places on road.

As may be understood from the above the present invention provides the following advantages: effective removal of noxious substances from waste gasses, and inactivation of acid effect caused by noxious substances, and hence, prevention of acid erosion and substantial life extension of installations and facilitation of collection of acid solutions.

I claim:
1. A waste gas processing method comprising the steps of:
supplying water to a reservoir contained in a water processing apparatus, said reservoir having a ground electrode and a pair of voltage-applying electrodes, a dc power supply, first and second high-frequency switching devices connected to the dc power supply via a variable resistor to convert the dc voltage from the dc power supply to a high-frequency ac voltage for applying to the voltage-applying electrodes, a high-frequency switching command circuit comprising a flip-flop circuit, and a high-frequency oscillator;

energizing said high-frequency oscillator by said dc power supply; thereby supplying said high-frequency switching command circuit with a high-frequency signals thereby causing said high-frequency switching command circuit to direct a high-frequency switching command signal to said first and second high-frequency switching devices alternately; thereby applying a high-frequency ac voltage to said voltage-applying electrodes; and supplying water from the reservoir to at least one spraying nozzle positioned in the flow of waste gas.

2. A waste gas processing method comprising the steps of:

supplying water to a reservoir contained in a water processing apparatus, said reservoir having a ground electrode and a pair of voltage-applying electrodes, a dc power supply, first and second high-frequency switching devices connected to the dc power supply via a variable resistor to convert the dc voltage from the dc power supply to a high-frequency ac voltage for applying to the voltage-applying electrodes, a high-frequency switching command circuit comprising a flip-flop circuit, and a high-frequency oscillator direct;

energizing said high-frequency oscillator by said dc power supply; thereby supplying said high-frequency switching command circuit with a high-frequency signals thereby causing said high-frequency switching command circuit to direct a high-frequency first and second high-frequency switching devices alternatively: thereby applying a high-frequency ac voltage to said voltage applying electrodes; and supplying water from the reservoir to a screen tank positioned in a waste duct such that waste gas flows through the screen tank.

3. A waste gas processing method according to claim 1 or claim 2 wherein said reservoir has two opposing ground electrodes; and first and second low-frequency switching devices are connected to the opposing ground electrodes and to a low-frequency switching command circuit, which is connected to the high-frequency oscillator.

* * * * *